United States Patent [19]
Petruchik

[11] Patent Number: 5,890,023
[45] Date of Patent: Mar. 30, 1999

[54] APPARATUS FOR PROVIDING FOGGED WRITE-ON BORDERS ON FILM FRAME IN CAMERA

[75] Inventor: Dwight J. Petruchik, Honeoye Falls, N.Y.

[73] Assignee: Eastman Kodak Company, Rochester, N.Y.

[21] Appl. No.: 6,978

[22] Filed: Jan. 14, 1998

[51] Int. Cl.⁶ .................................................. G03B 17/24
[52] U.S. Cl. ............................................................. 396/315
[58] Field of Search ...................................... 396/315, 313

[56] References Cited

U.S. PATENT DOCUMENTS

| | | | |
|---|---|---|---|
| 4,025,932 | 5/1977 | Miyagawa | 396/313 |
| 4,183,645 | 1/1980 | Ohmura et al. | 396/315 |
| 5,075,705 | 12/1991 | Harvey | 396/315 |
| 5,162,830 | 11/1992 | Schappler, et al. | 396/313 |
| 5,517,266 | 5/1996 | Funaki, et al. | 396/319 |
| 5,519,463 | 5/1996 | Nakamura, et al. | 396/315 |
| 5,555,467 | 9/1996 | Miyamoto | 396/315 |
| 5,600,386 | 2/1997 | Saito et al. | 396/315 |
| 5,758,220 | 5/1998 | Miyadera | 396/315 X |

*Primary Examiner*—W. B. Perkey
*Attorney, Agent, or Firm*—Roger A. Fields

[57] ABSTRACT

A camera for recording images of subjects on a light-sensitive substance, including an output source for producing a particular output that provides blank areas without image content in the recorded images to make write-on spaces available on prints corresponding to the recorded images, is characterized in that the output source is able to have its actual output varied in order to vary the blank areas from one recorded image to another and provide similar varied write-on spaces on prints corresponding to the recorded images, and a multi-position selector is coupled with the output source for movement to respective positions to vary the actual output of the output source.

11 Claims, 7 Drawing Sheets

APPARATUS FOR PROVIDING FOGGED WRITE-ON BORDERS ON FILM FRAME IN CAMERA

FIELD OF THE INVENTION

The invention relates generally to the field of photography, and in articular to cameras. More specifically, the invention relates to apparatus for providing varied length and/or varied location fogged write-on borders on film frames exposed in a camera.

BACKGROUND OF THE INVENTION

It is desirable to place written information on the face rather than on the back of photographic prints. Written information on the back of photographic prints is not visible when the prints are mounted in an album.

It has been proposed to provide a narrow white write-on border along the bottom edge portion of a photographic print. This allows written information to be placed on the face of the photographic print.

To obtain a write-on border for the photographic print, a camera for exposing latent images of subjects on a light-sensitive filmstrip includes a light source that is activated to fog respective bottom edge portions of the latent images during film movement in the camera. As a result, the bottom edge portions of the latent images are rendered indistinct or blank, i.e. without any image content, through exposure to light. This is further described in prior art U.S. Pat. No. 5,075,705 issued Dec. 24, 1991. The size and the location of the fogged portions of the latent images and, thus, the size and location of the blank write-on portions for the photographic prints are always the same.

SUMMARY OF THE INVENTION

A camera for recording images of subjects on a light-sensitive substance, including an output source for producing a particular output that provides blank areas without image content in the recorded images to make write-on spaces available on prints corresponding to the recorded images, is characterized in that:

the output source is able to have its actual output varied in order to vary the blank areas from one recorded image to another and provide similar varied write-on spaces on prints corresponding to the recorded images; and a multi-position selector is coupled with the output source for movement to respective positions to vary the actual output of the output source.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
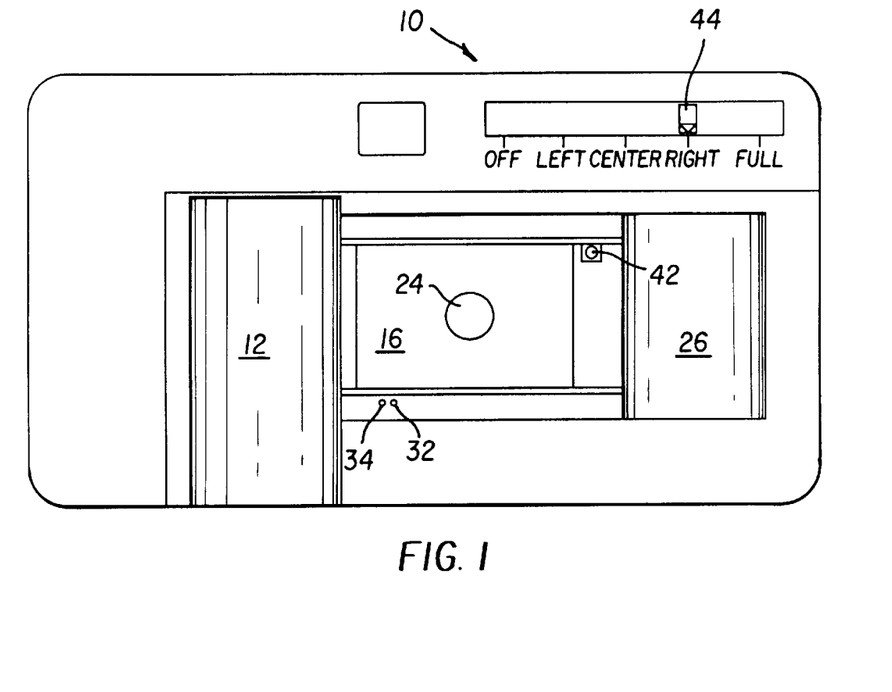
FIG. 1 is a rear elevation view of a opened camera according to a preferred embodiment of the invention.
Figure 2:
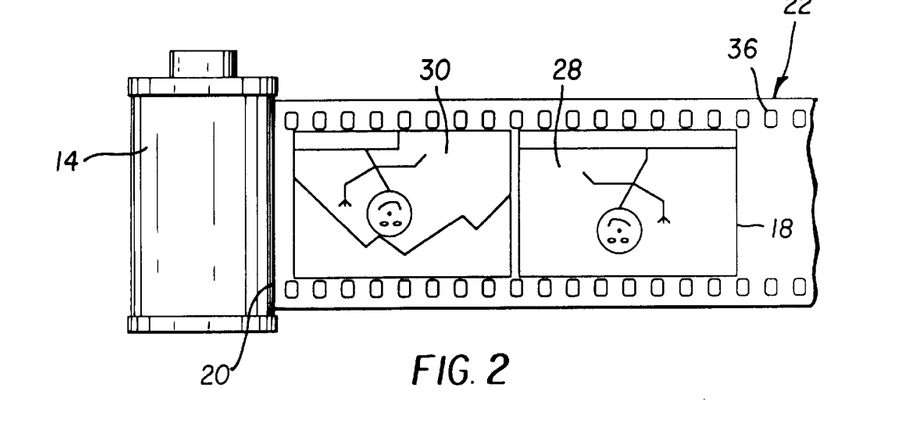
FIG. 2 is an elevation view of a film cartridge and filmstrip to be used in the camera.

Referring now to the drawings, FIGS. 1 and 2 show a camera 10 comprising a cartridge receiving chamber 12 for receiving a known film cartridge 14, a backframe opening 16 at which successive film frames, e.g. 18 and 20, of a filmstrip 22 from the film cartridge are exposed when a shutter 24 is momentarily removed from behind a taking lens (not shown), and an exposed film take-up chamber 26 in which the filmstrip is incrementally wound in a roll following each film exposure. FIG. 2 shows the film frames 18 and 20 with exposed latent images 28 and 30 as they would be oriented (upside down) in the camera 10.

Figure 3:
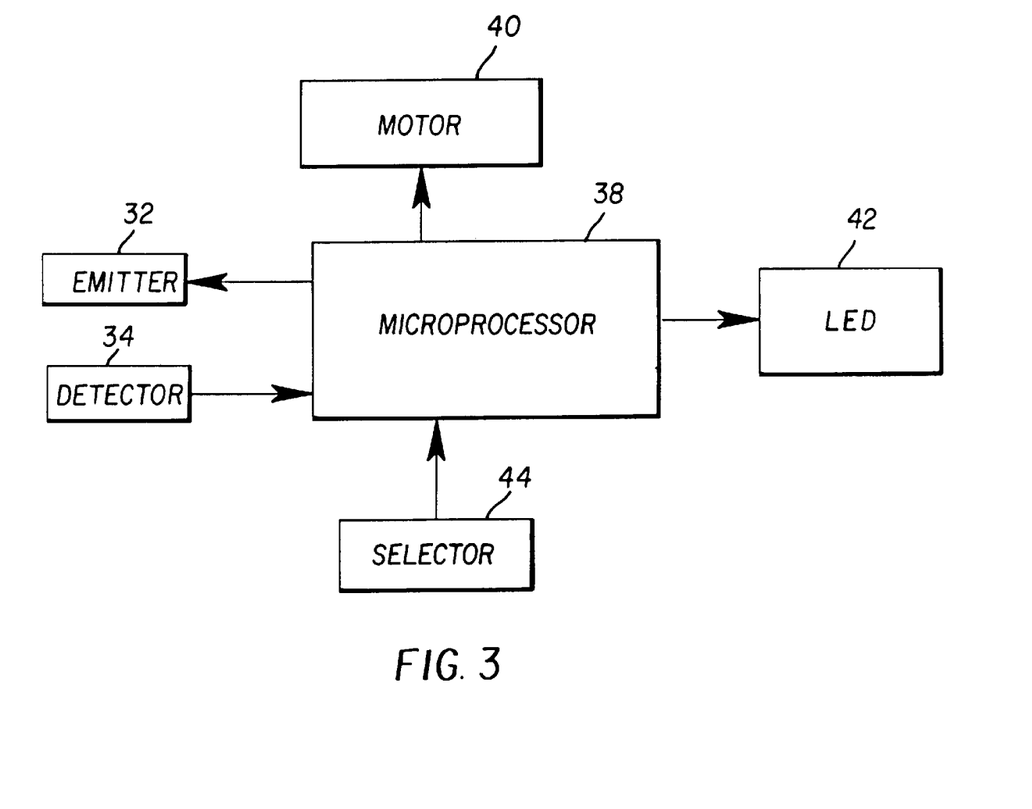
FIG. 3 is a schematic view of several components in the camera.
Figure 6:
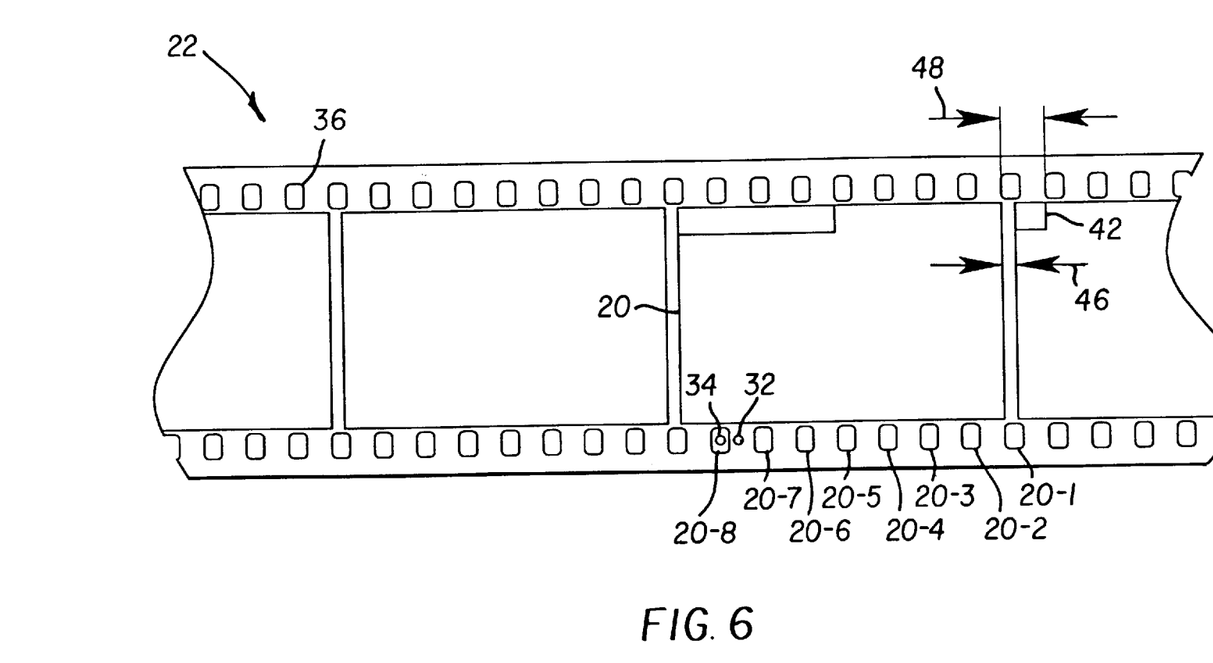
FIG. 6 is an enlarged view of a longitudinal section of the filmstrip shown in FIG. 2.

As shown in FIGS. 1, 3 and 6, the camera 10 further includes a known light emitter 32 and light detector 34 for sensing successive identical-pitch perforations 36 in the filmstrip 22 and inputting each perforation sensing to a known microprocessor 38, a motor 40 controlled via the microprocessor for advancing the filmstrip successive frame increments from the film cartridge 14 to the exposed film take-up chamber 26 following each exposure, a film edge-exposing light-emitting diode (LED) 42 turned "On" and "Off" via the microprocessor , and a multi-position manual selector 44 that inputs the selected position to the microprocessor.

Figure 4:
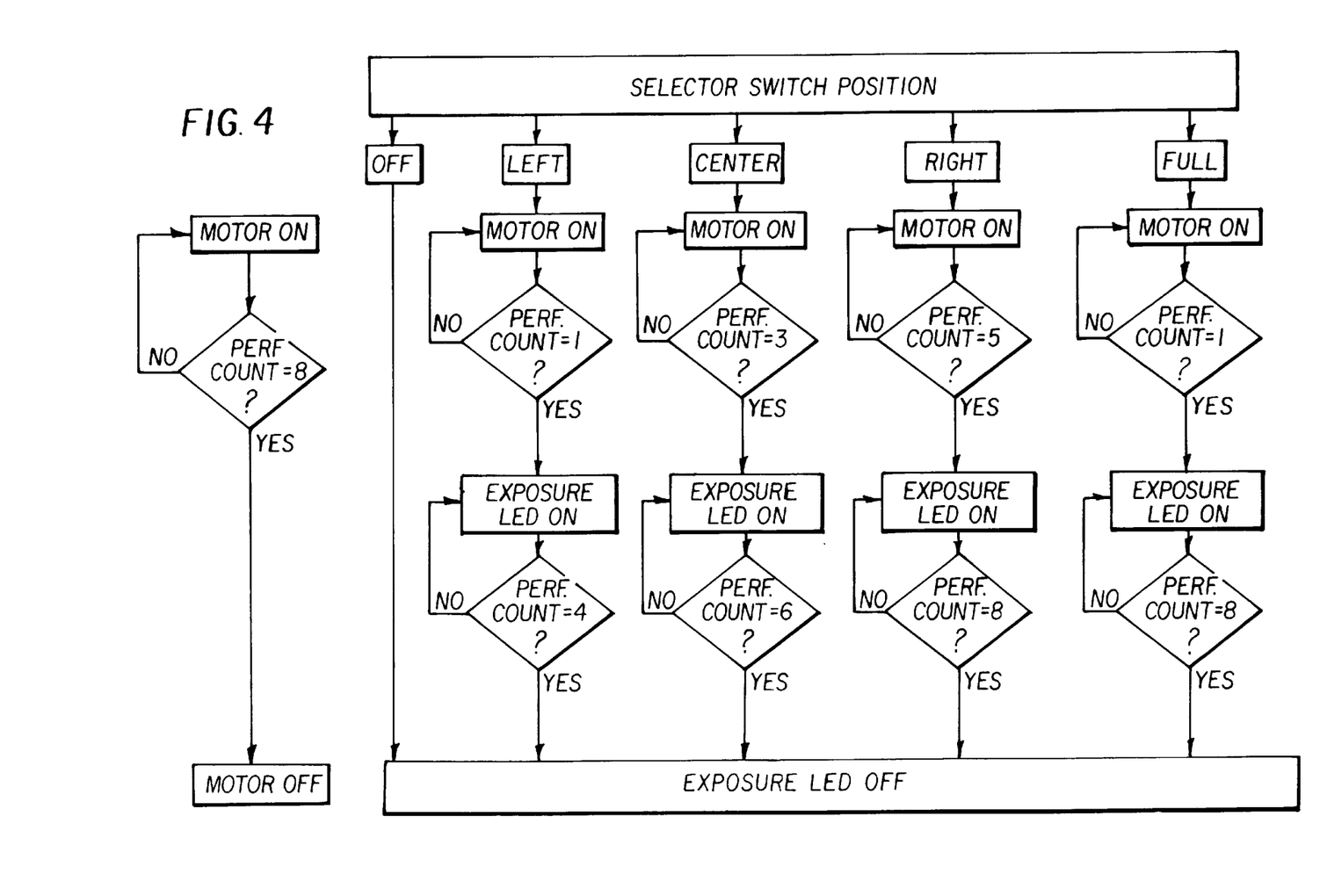
FIG. 4 is a flow chart depicting operation of the camera.
Figure 5:
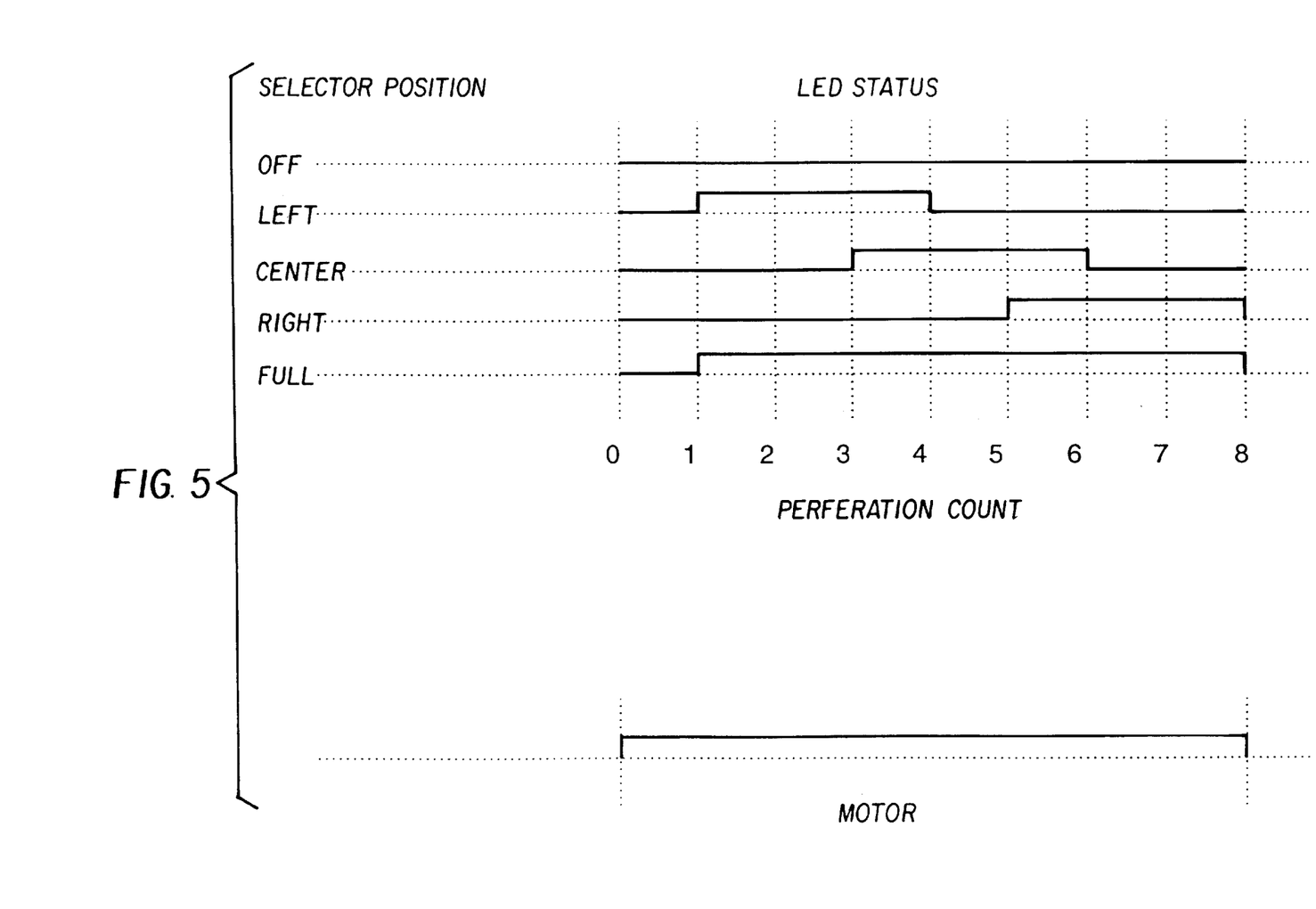
FIG. 5 is a time-line diagram depicting operation of the camera.

As is conventional, the filmstrip 22 has eight perforations 36 per film frame. In FIG. 6, eight perforations for the film frame 20 are indicated as 20-1, 20-2, 20-3, 20-4, 20-5, 20-6, 20-7 and 20-8. If, as shown in FIG. 4, the motor 40 is "On" to advance the filmstrip 22 one frame increment, it will be turned "Off" when the light detector 34 inputs eight perforation sensings to the microprocessor 38. Thus, in FIG. 2, the film frame 20 will be positioned for exposure in the backframe opening 16 after the light detector 34 inputs the eight perforation 20-1, 20-2, 20-3, 20-4, 20-5, 20-6, 20-7 and 20-8 sensings to the microprocessor 38.

As shown in FIG. 6, the interframe width dimension 46, i.e. the distance between successive film frames, is less than the pitch dimension 48 of the film frames. The width of the LED 42+the interframe width dimension 46=the pitch dimension 48.

Operation

Figure 7:
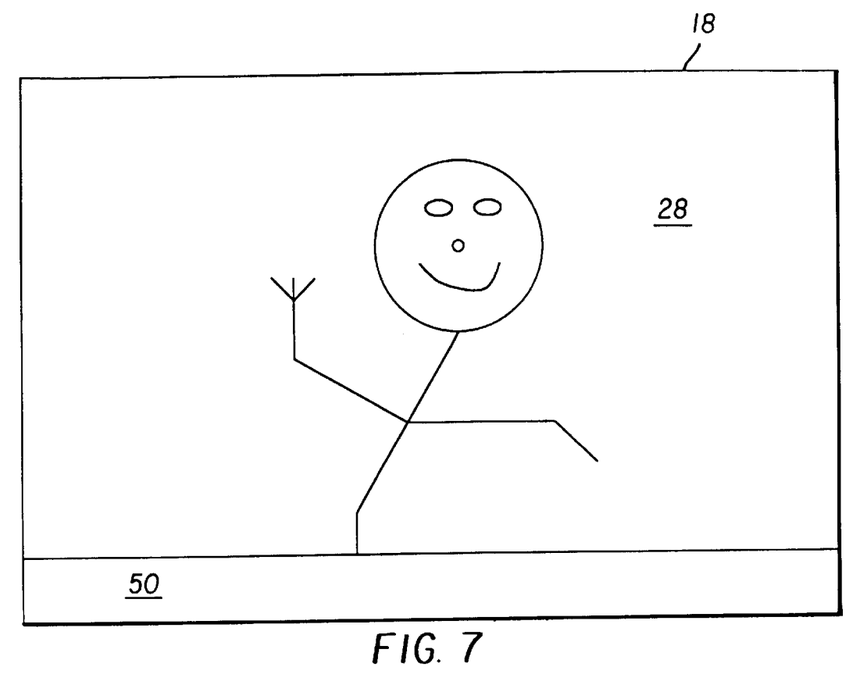
FIGS. 7, 8, 9 and 10 are elevation views of successive film frames of the filmstrip, each having a different blank area without image content.

As shown in FIGS. 1–7, when the multi-position manual selector 44 is in a "Full" selection-position, it inputs that selected position to the microprocessor 38. If the motor 40 is turned "On" to advance the filmstrip 22 a single frame increment, i.e. eight perforations 36, and the light detector 34 inputs a perforation count of "1" to the microprocessor 38, the LED 42 is turned "On". When the light detector 34 inputs a perforation count of "8" to the microprocessor 38, the motor 40 and the LED 42 are turned "Off". While the motor 40 and the LED 42 are "On", the LED fogs an edge portion of the latent image in the film frame that is being moved out of the backframe opening 16. In FIGS. 2 and 7, the LED 42 has fogged an edge portion 50 of the latent image 30 in the film frame 18 as the film frame is moved out of the backframe opening 16. The fogged portion 50 is used to make a blank write-on border available on a print corresponding to the latent image 28, as described in prior art U.S. Pat. No. 5,075,705 issued Dec. 24, 1991.

Figure 8:
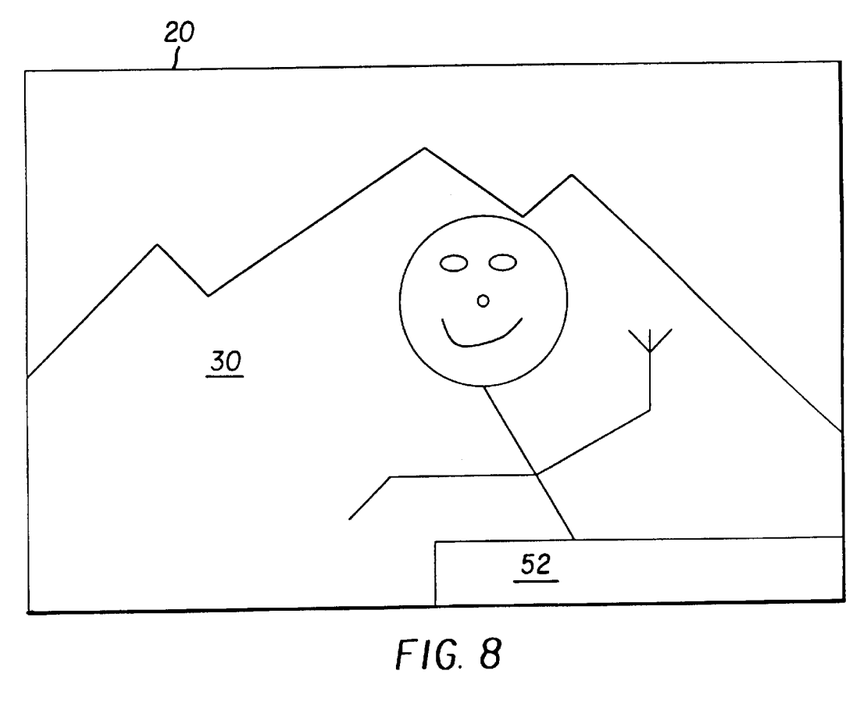

As shown in FIGS. 1–5 and 8, when the multi-position manual selector 44 is in a "Right" selection-position, it inputs that selected position to the microprocessor 38. If the motor 40 is turned "On" to advance the filmstrip 22 a single frame increment, i.e. eight perforations 36, and the light detector 34 inputs a perforation count of "5" to the microprocessor 38, the LED 42 is turned "On". When the light detector 34 inputs a perforation count of "8" to the microprocessor 38, the motor 40 and the LED 42 are turned "Off". While the motor 40 and the LED 42 are "On", the LED fogs an edge portion of the latent image in the film frame that is being moved out of the backframe opening 16. In FIGS. 2 and 8, the LED 42 has fogged an edge portion 52 of the latent image 30 in the film frame 20 as the film frame is moved out of the backframe opening 16. The fogged portion 52 is used to make a blank write-on border available on a print corresponding to the latent image 30, as described in prior art U.S. Pat. No. 5,075,705 issued Dec. 24, 1991.

Figure 9:
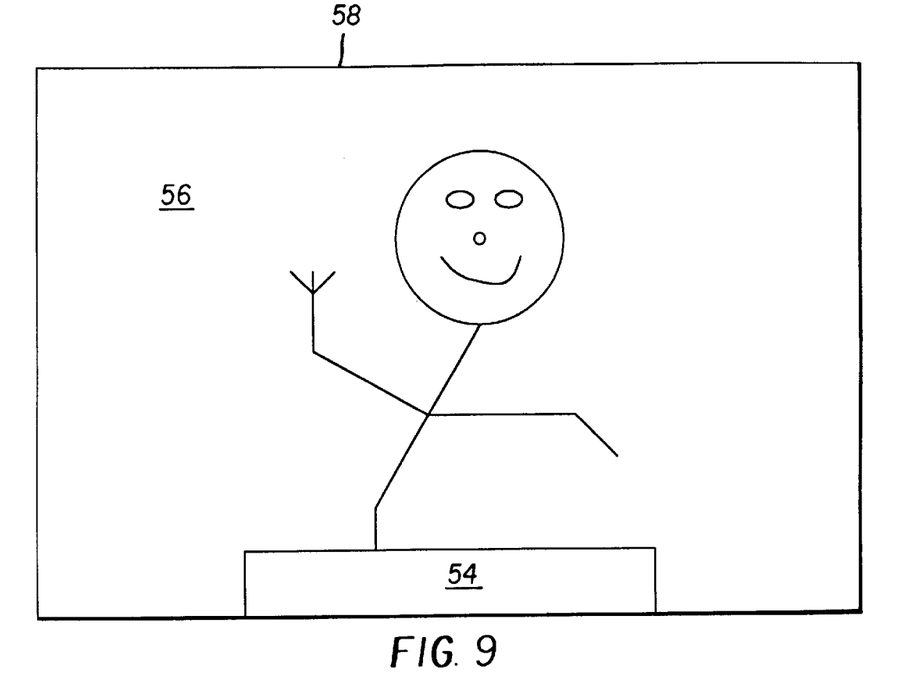

As shown in FIGS. 1, 3–5 and 9, when the multi-position manual selector 44 is in a "Center" selection-position, it inputs that selected position to the microprocessor 38. If the motor 40 is turned "On" to advance the filmstrip 22 a single frame increment, i.e. eight perforations 36, and the light detector 34 inputs a perforation count of "3" to the microprocessor 38, the LED 42 is turned "On". When the light detector 34 inputs a perforation count of "6" to the microprocessor 38, the LED 42 is turned "Off". The motor 40 continues "On" until the light detector 34 inputs a perforation count of "8" to the microprocessor 38. While the motor 40 and the LED 42 are "On", the LED fogs an edge portion of the latent image in the film frame that is being moved out of the backframe opening 16. In FIG. 9, the LED 42 has fogged an edge portion 54 of a latent image 56 in a film frame 58 as the film frame is moved out of the backframe opening 16. The fogged portion 54 is used to make a blank write-on border available on a print corresponding to the latent image 56, as described in prior art U.S. Pat. No. 5,075,705 issued Dec. 24, 1991.

Figure 10:
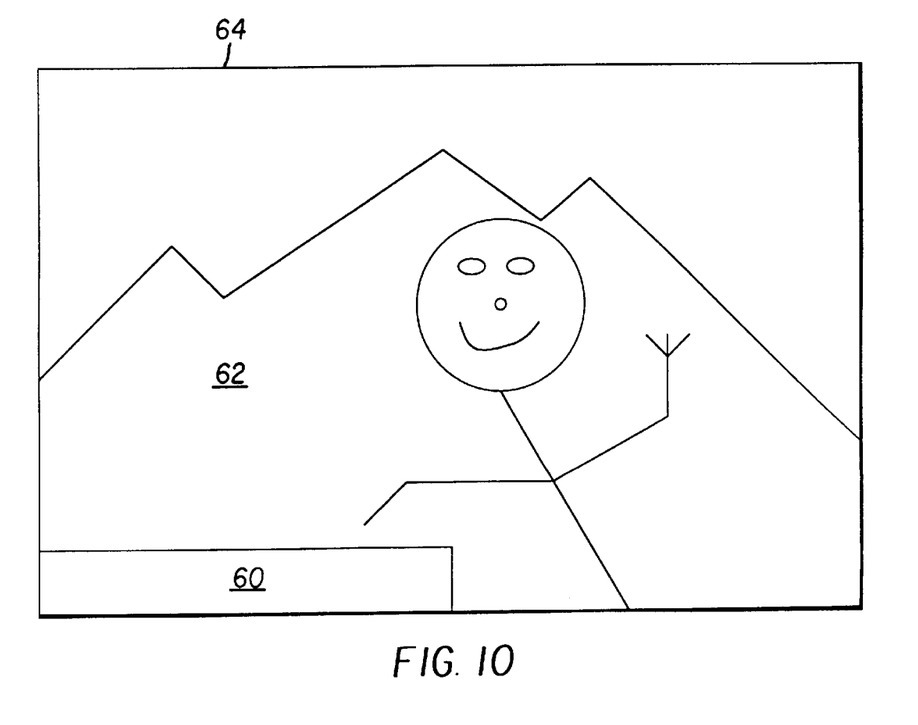

As shown in FIGS. 1, 3–5 and 10, when the multi-position manual selector 44 is in a "Left" selection-position, it inputs that selected position to the microprocessor 38. If the motor 40 is turned "On" to advance the filmstrip 22 a single frame increment, i.e. eight perforations 36, and the light detector 34 inputs a perforation count of "1" to the microprocessor 38, the LED 42 is turned "On". When the light detector 34 inputs a perforation count of "4" to the microprocessor 38, the LED 42 is turned "Off". The motor 40 continues "On" until the light detector 34 inputs a perforation count of "8" to the microprocessor 38. While the motor 40 and the LED 42 are "On", the LED fogs an edge portion of the latent image in the film frame that is being moved out of the backframe opening 16. In FIG. 10, the LED 42 has fogged an edge portion 60 of a latent image 62 in a film frame 64 as the film frame is moved out of the backframe opening 16. The fogged portion 60 is used to make a blank write-on border available on a print corresponding to the latent image 62, as described in prior art U.S. Pat. No. 5,075,705 issued Dec. 24, 1991.

As shown in FIGS. 1 and 3–5, when the multi-position manual selector 44 is in a "Off" selection-position, it inputs that selected position to the microprocessor 38. If the motor 40 is turned "On" to advance the filmstrip 22 a single frame increment, i.e. eight perforations 36, the LED 42 is prevented from being turned "On". When the light detector 34 inputs a perforation count of "8" to the microprocessor 38, the motor 40 is turned "Off". Since the LED 42 is never "On", there is no fogging of an edge portion of the latent image in the film frame that is being moved out of the backframe opening 16.

The invention has been described with reference to a preferred embodiment. However, it will be appreciated that variations and modifications can be effected by a person of ordinary skill in the art without departing from the scope of the invention. For example, the instead of the camera exposing latent images of subjects on a light-sensitive filmstrip, the camera can expose electronic images on a CCD.

PARTS LIST 10. camera
12. cartridge receiving chamber
14. film cartridge
16. backframe opening
18. film frame
20. film frame
20-1. first perforation for the film frame 20
20-2. second perforation for the film frame 20
20-3. third perforation for the film frame 20
20-4. fourth perforation for the film frame 20
20-5. fifth perforation for the film frame 20
20-6. sixth perforation for the film frame 20
20-7. seventh perforation for the film frame 20
20-8. eighth perforation for the film frame 20
22. filmstrip
24. shutter
26. exposed film take-up chamber
28. latent image
30. latent image
32. light emitter
34. light detector
36. film perforations
38. microprocessor
40. motor
42. LED
44. multi-position selector
46. interframe width dimension
48. pitch dimension
50. fogged edge portion
52. fogged edge portion
54. fogged edge portion
56. latent image
58. film frame
60. fogged edge portion
62. latent image
64. film frame

What is claimed is:

1. A camera for recording images of subjects on a light-sensitive substance, including an output source for producing a particular output that provides blank areas without image content in the recorded images to make write-on spaces available on prints corresponding to the recorded images, is characterized in that:

said output source is able to have its actual output varied in order to vary the blank areas from one recorded image to another and provide similar varied write-on spaces on prints corresponding to the recorded images; and a multi-position selector is coupled with said output source for movement to respective positions to vary the actual output of the output source.

2. A camera as recited in claim 1, wherein one of the positions of said multi-position selector prevents said output source from producing any output in order to prevent a blank area from being provided in one of the recorded images.

3. A camera as recited in claim 1, wherein said output source varies the duration of its actual output in accordance with the selected position of said multi-position selector in order to vary the blank areas from one recorded image to another.

4. A camera for recording images of subjects on successive film frames of a light-sensitive filmstrip, including a light source activated to fog respective edge portions of the recorded images during film movement successive frame increments to make blank write-on borders available on prints corresponding to the recorded images, is characterized in that:

said light source can be activated for different duration's during film movement successive frame increments to fog the edge portions of the latent images different periods of time equal to the different duration's the light source is activated in order to provide similarly different write-on borders on prints; and a multi-position selector is coupled with said light source for movement to respective positions to activate the light source for different duration's during film movement successive frame increments.

5. A camera for exposing latent images of subjects on a light-sensitive filmstrip, including a light source activated to fog respective edge portions of the latent images during film movement in order to make blank write-on borders available on prints corresponding to the latent images, is characterized in that:

said light source can be activated for different duration's during film movement to fog the edge portions of the latent images for different lengths in order to provide similarly different write-on borders on prints; and a multi-position selector is coupled with said light source for movement to respective positions to activate the light source for different duration's during film movement.

6. A camera for exposing latent images of subjects on successive film frames of a light-sensitive filmstrip, including a light source activated to fog respective edge portions of the latent images during film movement successive frame increments, is characterized in that:

said light source can be activated at different times during film movement successive frame increments to fog the edge portions of the latent images at different locations; and a multi-position selector is coupled with said light source for movement to respective positions to activate the light source at different times during film movement successive frame increments.

7. A camera for exposing latent images of subjects on successive film frames of a light-sensitive filmstrip, including a light source activated to fog respective edge portions of the latent images during film movement successive frame increments, is characterized in that:

said light source can be activated at different times and for different duration's during film movement successive frame increments to fog the edge portions of the latent images at different locations and for different lengths; and a multi-position selector is coupled with said light source for movement to respective positions to activate the light source at different times and for different duration's during film movement successive frame increments.

8. A camera as recited in claim 7, wherein a film perforation sensing device is arranged to determine the relative position of a film frame in regard to said light source and is coupled with the light source and said multi-position selector to begin and end activation of the light source in accordance with a selected position of the multi-position selector and the relative position of the film frame in regard to the light source.

9. A camera comprising an edge-exposing light source for blank-exposing respective edge portions of successive film frames of a filmstrip during film movement successive frame increments, is characterized in that;

a multi-choice selector coupled with said light source selectively turns the light source on and off in coordination with film movement successive frame increments to vary edge exposed portions of the film frames from one film frame to another.

10. A method of recording images of subjects on a light-sensitive substance, including the step of producing a particular output that provides blank areas without image content in the recorded images to make write-on spaces available on prints corresponding to the recorded images, is characterized in that:

the actual output is varied in order to vary the blank areas from one recorded image to another and provide similar varied write-on spaces on prints corresponding to the recorded images.

11. A method of recording images of subjects on successive film frames of a light-sensitive filmstrip in a camera, including the step of activating a light source to fog respective edge portions of the recorded images during film movement successive frame increments to make blank write-on borders available on prints corresponding to the recorded images, is characterized in that:

the light source is activated for different duration's during film movement successive frame increments to fog the edge portions of the latent images different periods of time in order to provide varied write-on borders on prints.

* * * * *